(12) United States Patent
Bang et al.

(10) Patent No.: US 8,120,464 B2
(45) Date of Patent: Feb. 21, 2012

(54) RFID READER AND METHOD FOR REMOVING A TRANSMISSION CARRIER LEAKAGE SIGNAL

(75) Inventors: Hee-mun Bang, Seoul (KR); Yun-seong Eo, Seoul (KR); Ick-jin Kwon, Hwaseong-si (KR); Heung-bae Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1067 days.

(21) Appl. No.: 11/634,099

(22) Filed: Dec. 6, 2006

(65) Prior Publication Data

US 2007/0194886 A1 Aug. 23, 2007

(30) Foreign Application Priority Data

Feb. 6, 2006 (KR) .................. 10-2006-0011021

(51) Int. Cl.
G08B 21/00 (2006.01)

(52) U.S. Cl. .............. 340/10.1; 340/10.2; 340/10.3; 340/10.4; 375/346; 375/349

(58) Field of Classification Search ............ 340/10.1, 340/10.2, 10.3, 10.31, 10.32, 10.4, 10.41; 375/346–350, 332
See application file for complete search history.

(56) References Cited

U.S. PATENT DOCUMENTS

| | | | | |
|---|---|---|---|---|
| 5,613,228 A * | 3/1997 | Tuttle et al. | ................ | 455/127.2 |
| 5,649,296 A * | 7/1997 | MacLellan et al. | ............. | 455/39 |
| 5,896,060 A * | 4/1999 | Ovard et al. | .................. | 329/304 |
| 5,974,301 A * | 10/1999 | Palmer et al. | ................ | 455/63.1 |
| 6,246,106 B1 * | 6/2001 | Sugimoto et al. | ............ | 257/666 |
| 6,340,932 B1 * | 1/2002 | Rodgers et al. | ............ | 340/572.7 |
| 6,567,649 B2 * | 5/2003 | Souissi | .......................... | 455/83 |
| 2004/0027240 A1 * | 2/2004 | Greeff et al. | ................. | 340/10.3 |
| 2006/0033607 A1 * | 2/2006 | Bellantoni | .................... | 340/10.1 |
| 2006/0045219 A1 * | 3/2006 | Wang et al. | ................... | 375/346 |

FOREIGN PATENT DOCUMENTS

KR 100617322 8/2006

\* cited by examiner

*Primary Examiner* — Jennifer Mehmood
*Assistant Examiner* — Mark Rushing
(74) *Attorney, Agent, or Firm* — Sughrue Mion, PLLC

(57) ABSTRACT

A radio frequency identification (RFID) reader is provided, having a transmitting circuit that generates a transmitted signal to operate an RFID tag, a receiving circuit that receives a received signal including a tag signal from the RFID tag and a transmission carrier leakage signal leaking from the transmitting circuit, and a leakage removing circuit that senses a phase and amplitude of the transmission carrier leakage signal inputted to the receiving circuit, converts the transmitted signal from the transmitting circuit into a signal having a phase opposite to that of the transmission carrier leakage signal and an amplitude equal to that of the transmission carrier leakage signal, and synthesizes the converted signal and the received signal inputted to the receiving circuit.

7 Claims, 7 Drawing Sheets

RFID READER AND METHOD FOR REMOVING A TRANSMISSION CARRIER LEAKAGE SIGNAL

CROSS REFERENCE TO RELATED APPLICATIONS

This application claims priority from Korean Patent Application No. 10-2006-0011021, filed on Feb. 6, 2006, in the Korean Intellectual Property Office, the disclosure of which is incorporated herein by reference

BACKGROUND OF THE INVENTION

1. Field of the Invention

Apparatuses and methods consistent with the present invention relate to a radio frequency identification (RFID) reader, and more particularly, to an RFID reader which addresses problems of signal deterioration and DC offset by effectively removing a transmission carrier leakage signal being inputted from a transmitting circuit to a receiving circuit, and which has a simple circuit construction.

2. Description of the Related Art

A ubiquitous sensor network (USN) has recently received a lot of attention as the basic infrastructure for realizing a ubiquitous society, which is one of the big issues in the information and communication field. The USN is a technology that adopts an electronic tag having a communication function, which is attached to every object, that detects neighboring environmental information on the basis of recognized information of the object obtained through the electronic tag, and manages and uses the detected information in real time through a network.

The core of the USN is an RFID system, which is composed of a reader, an antenna, an electronic tag, a server, and a network. Here, the reader serves to read information stored in the electronic tag or store information in the electronic tag, and the antenna exchanges data stored in the electronic tag by defined frequencies and protocols.

FIG. 1 is a schematic circuit diagram of a related RFID system composed of an RFID tag and an RFID reader 10. As illustrated in FIG. 1, the RFID reader 10 includes a transmitting circuit 20, a receiving circuit 25, a phase locked loop (PLL) 21, and a processing circuit 27.

The transmitting circuit 20 generates a transmitted signal of a specified frequency that is transferred to the RFID tag 30, and the receiving circuit 25 receives a received signal reflected from the RFID tag 30.

The PLL 21 is a circuit that detects a phase difference between the transmitted signal and the received signal, and controls the phase of a synthesizer using a voltage, which is in proportion to the phase difference, so that the phase of the received signal and the phase of the transmitted signal become equal to each other.

The processing circuit 27 controls the transmitting circuit 20 to transmit the transmitted signal to the RFID tag 30, and acquires information of the RFID tag 30 by reading the signal received in the receiving signal 25.

The transmitting circuit 20 and the receiving circuit 25 includes an antenna 11, a filter 13, and a DC coupler 15. The antenna 11 transmits the transmitted signal from the transmitted circuit 20 to the RFID tag 30, and receives the received signal reflected from the RFID tag 30 to transfer the received signal to the receiving circuit 25. The filter 13 filters the transmitted signal and the received signal with a desired size, and the DC coupler 15 adjusts the DC voltages of the transmitted signal and the received signal.

Generally, in the case of a wireless appliance, the transmitted circuit 20 and the receiving circuit 25 operate separately, and the signal transmitted form the transmitting circuit 20 and the signal received in the receiving circuit 25 have frequencies different from each other. Accordingly, the receiving circuit 25 can be in an off state while the transmitting circuit 20 operates, and this prevents the signal transmitted from the transmitting circuit 20 from being directly inputted to the receiving circuit 25.

By contrast, in the case of the RFID system, since the transmitting circuit 20 and the receiving circuit 25 use the same frequency and the distance to the RFID tag 30 cannot be known, the transmitting circuit 20 and the receiving circuit 25 are simultaneously in an on state. If the transmitted signal as illustrated in (a) of FIG. 2 is transmitted from the transmitting circuit 20 in a state that both the transmitting circuit 20 and the receiving circuit 25 are simultaneously in an on state, a transmission carrier leakage signal as illustrated in (d) of FIG. 2 is directly inputted to the receiving circuit 25 through the antenna.

If the transmission carrier leakage signal is inputted to the receiving circuit 25 as described above, it acts as a noise, and a signal obtained by addition of the transmission carrier leakage signal to the received signal from the RFID tag 30 as illustrated in (b) of FIG. 2 is received in the receiving circuit 25, as illustrated in (e) of FIG. 2. Accordingly, although the received signal that can be obtained by filtering when no transmission carrier leakage signal exists is as shown in (c) of FIG. 2, the received signal that can be obtained by filtering when the transmission carrier leakage signal exist is as shown in (f) of FIG. 2, so that it is almost impossible to obtain the received signal from the RFID tag 30. As a result, problems of signal deterioration and DC offset may occur.

In addition, each component of the receiving circuit 25, e.g., a low noise amplifier (LNA) or a mixer, is designed to receive an input of a small-sized received signal from the RFID tag 30, and its linearity is low. Accordingly, if a large transmission carrier leakage signal is inputted from the transmitting circuit 20, the LNA of the receiving circuit 25 is saturated, resulting in an inoperable state.

In order to solve this problem, Mitsubishi Electric Corp. of Japan has developed a canceller circuit 55 that removes the transmission carrier leakage signal, as illustrated in FIGS. 3A and 3B.

As illustrated in FIGS. 3A and 3B, the canceller circuit 55 is positioned on a line connecting the transmitting circuit and the receiving circuit with each other, and includes an amplitude phase adjustment circuit 75, an amplitude phase comparison circuit 73, a pair of integrators 78 and 79, an adder 77, and a pair of couplers 70 and 71.

The amplitude phase comparison circuit 73 detects the amplitude and the phase of the received signal inputted to the receiving circuit, and transfers an amplitude error and a phase error, which have passed through the integrators 78 and 79, respectively, to the amplitude phase adjustment circuit 75.

The amplitude phase adjustment circuit 75 receives a nonmodulated signal generated from the transmitting circuit and the amplitude error and the phase error from the amplitude phase comparison circuit 73, and adjusts the amplitude and the phase of the received signals. In this case, the amplitude phase adjustment circuit 75 generates an adjusted signal by adjusting an unmodulated signal generated from the transmitting circuit so that the adjusted signal has an amplitude equal to that of the unmodulated signal and a phase opposite to that of the unmodulated signal.

The adder 77 adds the adjusted signal adjusted by the amplitude phase adjustment circuit 75 to the received signal to remove the diffracted transmission carrier leakage signal from the transmitting circuit.

However, since the related canceller circuit 55 is composed of a plurality of circuits, integrators 78 and 79, and others, and requires couplers 70 and 71 to receive the signals from the transmitting circuit and the receiving circuit, the circuit construction of the RFID reader becomes complicated. In addition, the errors may become greater due to the difference between the bidirectional output characteristics of the couplers 70 and 71, and the feedback circuit using the integrators 78 and 79 may become unstable due to its characteristics.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention has been developed in order to address the above drawbacks and other problems associated with the related arrangement. An aspect of the present invention is to provide an RFID reader which can solve problems of signal deterioration and DC offset by effectively removing a transmission carrier leakage signal being inputted from a transmitting circuit to a receiving circuit, and which has a simple circuit construction.

According to an aspect of the present invention, there is provided a radio frequency identification (RFID) reader, including a transmitting circuit that generates a transmitted signal to operate an RFID tag, a receiving circuit that receives a received signal including a tag signal from the RFID tag and a transmission carrier leakage signal leaking from the transmitting circuit, and a leakage removing circuit that senses a phase and an amplitude of the transmission carrier leakage signal inputted to the receiving circuit, converts the transmitted signal from the transmitting circuit into a signal having a phase opposite to that of the transmission carrier leakage signal and an amplitude equal to that of the transmission carrier leakage signal, and synthesizes the converted signal and the received signal inputted to the receiving circuit.

The leakage removing circuit may include a gain amplifier that converts the amplitude of the transmitted signal from the transmitting circuit, and a phase shifter that generates an offset signal by adjusting the phase of the transmitted signal from the gain amplifier so that the phase of the transmitted signal becomes opposite to the phase of the transmission carrier leakage signal.

The RFID reader may further include a signal detector installed on the receiving circuit that detects the transmission carrier leakage signal inputted to the receiving circuit and the offset signal generated through the gain amplifier and the phase shifter.

The leakage removing circuit may further include a first switch mounted on a front end of the signal detector on the receiving circuit that switches the input of the received signal on/off, and a second switch arranged on a signal line that connects the transmitting circuit and the receiving circuit with each other to switch on/off the offset signal to the receiving circuit.

When the signal detector detects the transmission carrier leakage signal, the first switch may be turned on, and the second switch may be turned off.

When the signal detector detects the offset signal, the first switch may be turned off, and the second switch may be turned on.

When the RFID tag is detected, both the first switch and the second switch are turned on, and the received signal inputted to the receiving circuit and the offset signal from the leakage removing circuit are synthesized to remove the transmission carrier leakage signal in the receiving circuit.

According to another aspect of the present invention, there is provided a radio frequency identification (RFID) reader having a transmitting circuit that generates a transmitted signal to operate an RFID tag and a receiving circuit that receives a received signal including a tag signal from the RFID tag and a transmission carrier leakage signal leaking from the transmitting circuit, which includes a gain amplifier that converts the amplitude of the transmitted signal from the transmitting circuit, a phase shifter that generates an offset signal by adjusting the phase of the transmitted signal from the gain amplifier so that the phase of the transmitted signal becomes opposite to the phase of the transmission carrier leakage signal, and a signal detector installed on the receiving circuit that detects the transmission carrier leakage signal inputted to the receiving circuit and the offset signal generated through the gain amplifier and the phase shifter.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF THE EXEMPLARY EMBODIMENTS OF THE INVENTION

Certain exemplary embodiments of the present invention will be described in greater detail with reference to the accompanying drawings.

Figure 4:
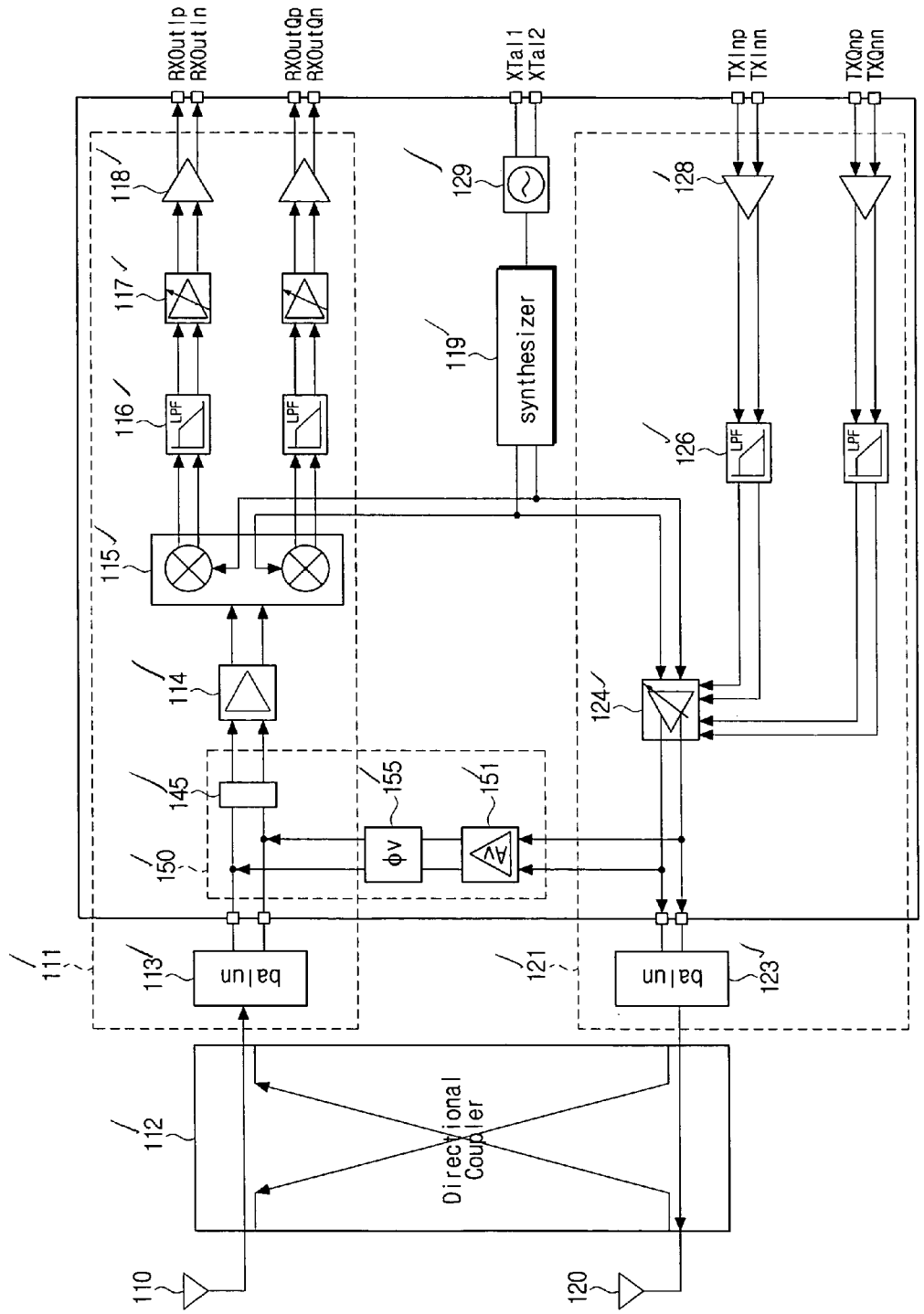
FIG. 4 is a circuit diagram of an RFID reader having a leakage removing circuit according to an exemplary embodiment of the present invention.

FIG. 4 is a circuit diagram of an RFID reader having a leakage removing circuit 150 according to an exemplary embodiment of the present invention.

As illustrated in FIG. 4, the RFID reader according to the present invention includes a transmitting circuit 121, a receiving circuit 111, a leakage removing circuit 150, and directional coupler 112.

The transmitting circuit 121 includes a pair of input buffers 128, a pair of low pass filters (LPFs) 126, a variable amplifier 124, and a balun 123.

The respective input buffers 128 amplify quadrature signals (i.e., I-signal and Q-signal) from a processing circuit (not illustrated) that controls transmission, and generate a transmitted signal at a specified level. The respective LPFs 126 filter the quadrature signals (i.e., I-signal and Q-signal) from the respective buffers 128, and generate the quadrature signals having a desired amplitude.

The variable amplifier 124 combines the quadrature signals (I-signal and Q-signal) from the respective buffers 128 with differential signals from a synthesizer 119, and outputs differential signals of the I-signal and the Q-signal. The balun 123 converts the differential signals of the I-signal and the Q-signal from the variable amplifier 124 into a single transmitted signal. The transmitted signal from the balun 123 passes through the directional coupler 112, and then is transmitted to an RFID tag through a transmission antenna 120.

On the other hand, the receiving circuit 111 includes a balun 113, a low noise amplifier (LNA) 114, a pair of down mixer 115, a pair of filters 116, a pair of variable gain amplifiers 117, and a pair of buffers 118.

The balun 113 converts the received signal, which has been received through a reception antenna 110 and has passed through the directional coupler 112, into a differential signal. The LNA 114 amplifies the received signal received through the antenna.

The pair of down mixers 115 receive the received signal having been amplified through the LNA 114, and down-convert the received signal into a baseband signal using the differential signal from the synthesizer 119 to generate quadrature signals (i.e., I-signal and Q-signal).

The respective filters 116 remove noise from the quadrature signals (I-signal and Q-signal) having the baseband frequency by filtering the quadrature signals by a desired amplitude. The respective variable gain amplifiers 117 amplify the quadrature signals (I-signal and Q-signal) from the respective filters 116.

The synthesizer 119, which provides the differential signals to the variable amplifier 124 of the transmitting circuit 121 and the down mixer 115 of the receiving circuit 111, generates the differential signals having diverse frequencies for use in the RFID, and in this case, the frequency of the differential signal generated from the synthesizer 119 is equal to that of a center frequency of the transmitted signal. The synthesizer 119 is connected to a reference oscillator 129, and receives a signal from the reference oscillator 129.

The directional coupler 112 is provided between the transmission antenna 120 and the reception antenna 110 on one hand, and the respective baluns 113 and 123 on the other. The directional coupler 112 is provided with a pair of direct paths through which the transmitted signal from the transmitting circuit 121 and the received signal from the receiving circuit 111 are directly transmitted and received, respectively, and a pair of cross paths through which the received signal and the transmitted signal cross each other. Here, since the cross paths have a negative (−) loss that is lower than that of the direct paths, they can attenuate the received signal and the transmitted signal, and thus reduce the influence of the signals inputted from the transmitting circuit 121 to the receiving circuit 111 through the directional coupler 112.

Between the transmitting circuit 121 and the receiving circuit 111 as described above, the leakage removing circuit 150 to remove the transmission carrier leakage signal from the transmitting circuit 121 is installed.

The leakage removing circuit 150 includes a signal detector 145, a gain amplifier 151, and a phase shifter 155. The gain amplifier 151 and the phase shifter 155 are arranged on a pair of signal lines that connect the transmitting circuit 121 and the receiving circuit 111 with each other, and this pair of signal lines are connected between connection points of the balun 123 of the transmitting circuit 121 and the variable amplifier 124 and connection points of the balun 113 of the receiving circuit 111 and the LNA 114.

Figure 5:
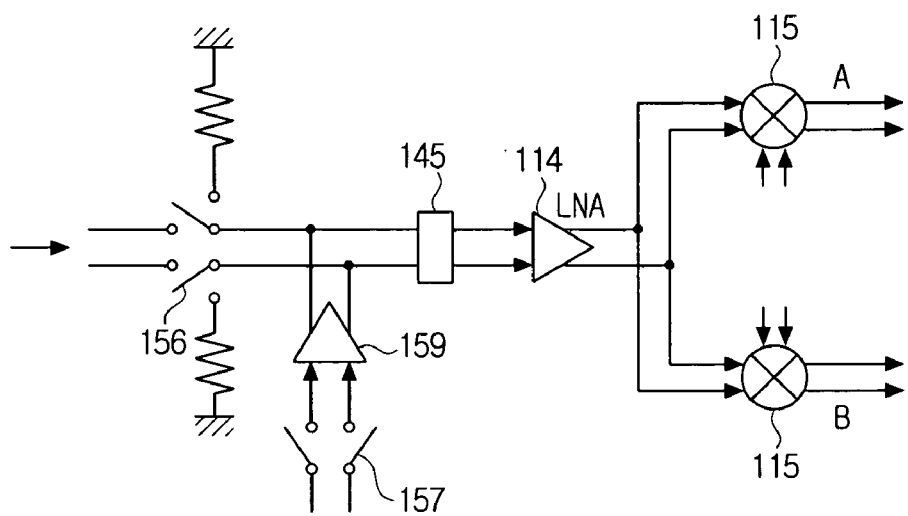
FIG. 5 is a detailed circuit diagram of a circuit part through which the leakage removing circuit of FIG. 4 and a receiving circuit are connected to each other.

FIG. 5 is a detailed circuit diagram of a circuit part through which the leakage removing circuit of FIG. 4 and a receiving circuit are connected to each other.

Referring to FIG. 5, a pair of first switches 156 are connected between the signal detector 145 and the balun 113, and are simultaneously turned on/off to intercept the signal and the transmission carrier leakage signal between the reception antenna 110 and the receiving circuit 111. Also, a pair of second switches 157 are connected between the phase shifter 153 and the receiving circuit 111, on the respective signal lines, and intercept the input of the transmitted signal generated from the transmitting circuit 121 to the receiving circuit 111. On the other hand, a buffer 159 is connected between the second switch 157 and the receiving circuit 111.

The signal detector 145 detects the amplitude and the phase of the transmission carrier leakage signal inputted from the transmitting circuit 121 to the receiving circuit 111 for an adjustment time when a power is supplied to the RFID reader and the transmitting circuit 121 is in an on state. At this time, by intercepting the power supplied to the receiving circuit 111, the components, including the LNA, are prevented from being saturated due to the transmission carrier leakage signal.

When the signal detector 145 detects the transmission carrier leakage signal as described above, the first switch 156 is turned on to allow the transmission carrier leakage signal to be inputted, while the second switch 157 is turned off to intercept the input of the transmitted signal from the transmitting circuit 121 to the receiving circuit 111.

The gain amplifier 151 receives the transmitted signal generated from the transmitting circuit 121, and adjusts the gain of the transmitted signal. That is, the gain amplifier 151 adjusts the gain of the transmitted signal in accordance with the amplitude of the transmission carrier leakage signal detected through the signal detector 145, so that the amplitude of the transmission carrier leakage signal and the amplitude of the transmitted signal become equal to each other.

The phase shifter 155 adjusts the phase of the transmitted signal, of which the amplitude has been adjusted by the gain amplifier, so that the phase of the transmitted signal becomes equal to the phase of the transmission carrier leakage signal, by shifting the phase of the transmitted signal, and inverts the phase of the transmitted signal. Accordingly, the transmitted signal from the transmitting circuit 121 has the phase opposite to the phase of the transmission carrier leakage signal inputted to the receiving circuit 111 to act as an offset signal.

The offset signal, which has the amplitude equal to that of the transmission carrier leakage signal and the phase opposite to that of the transmission carrier leakage signal, through the gain amplifier 151 and the phase shifter 155, is provided to the receiving circuit 111, and then is synthesized with the received signal inputted to the receiving circuit 111 to remove the transmission carrier leakage signal included in the received signal. In this case, the first and second switches 156 and 157 are all turned on, so that the received signal is inputted to the receiving circuit 111 and the transmitted signal from the transmitting circuit 121 is converted into the offset signal through the leakage removing circuit 150.

Figure 6:
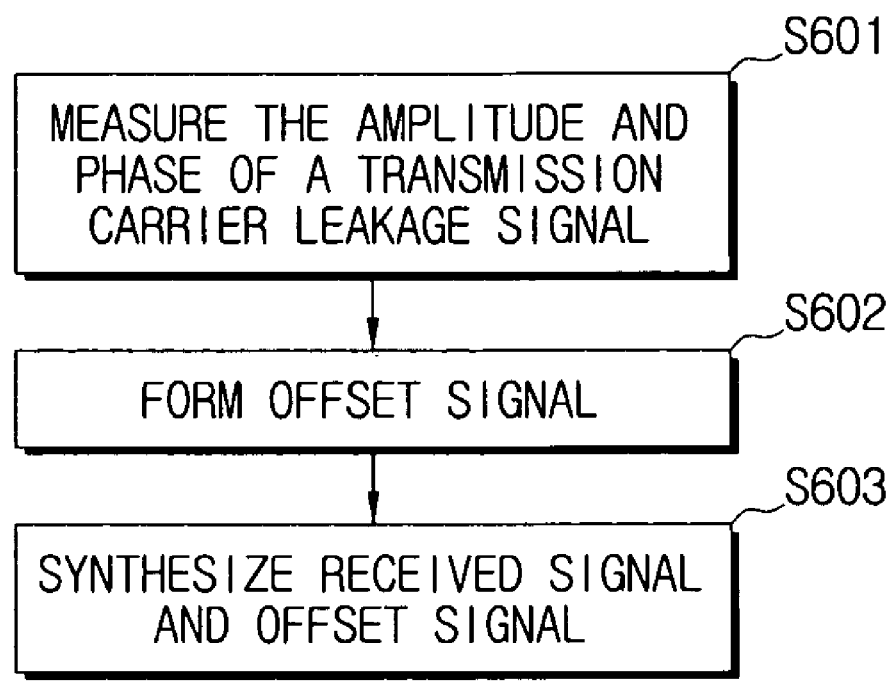
FIG. 6 is a flowchart diagram showing the process for removing a transmission carrier leakage signal in an RFID system according to an exemplary embodiment of the present invention.

The process of removing the transmission carrier leakage signal through the RFID system as seen in FIG. 6 will now be explained.

If the power is supplied to the RFID reader, a control unit (not illustrated) turns on the first switch 156 and turns off the second switch 157 to measure the amplitude and the phase of the transmission carrier leakage signal using the leakage removing circuit 150 (S601). Accordingly, the transmission carrier leakage signal from the transmitting circuit 121 is inputted to the signal detector 145 after passing through the first switch 156. The signal detector 145 detects the transmission carrier leakage signal and stores the detected signal in a memory (not illustrated) and so on.

Then, the control unit turns off the first switch 156 and turns on the second switch 157. Accordingly, the transmitted signal from the transmitting circuit 121 is adjusted through the gain amplifier 151 and the phase shifter 155 of the leakage removing circuit 150, so that an offset signal having an opposite phase is generated. The signal detector 145 detects the offset signal generated through the gain amplifier 151 and the phase shifter 155. The control unit adjusts the gain of the gain amplifier 151 and the phase of the phase shifter 155 until the offset signal has the amplitude equal to that of the transmission carrier leakage signal and the phase opposite to that of the transmission carrier leakage signal (S602).

As described above, the power is not supplied to the receiving circuit 111 until the amplitude and the phase of the transmission carrier leakage signal are measured, and the offset signal from the transmitting circuit 121 has the phase opposite to that of the transmission carrier leakage signal and the amplitude equal to that of the transmission carrier leakage signal.

If the transmitted signal is converted into the offset signal having the amplitude equal to that of the transmission carrier leakage signal and the phase opposite to that of the transmission carrier leakage signal through the leakage removing circuit 150, the control unit turns on both the first switch 156 and the second switch 157. In this case, the transmitted signal from the transmitting circuit 121 is transmitted to the RFID tag, and the signal reflected from the RFID tag and the transmission carrier leakage signal from the transmitting circuit 121 are synthesized, so that the synthesized signal is inputted to the receiving circuit 111 as the received signal (S603).

Figure 1:
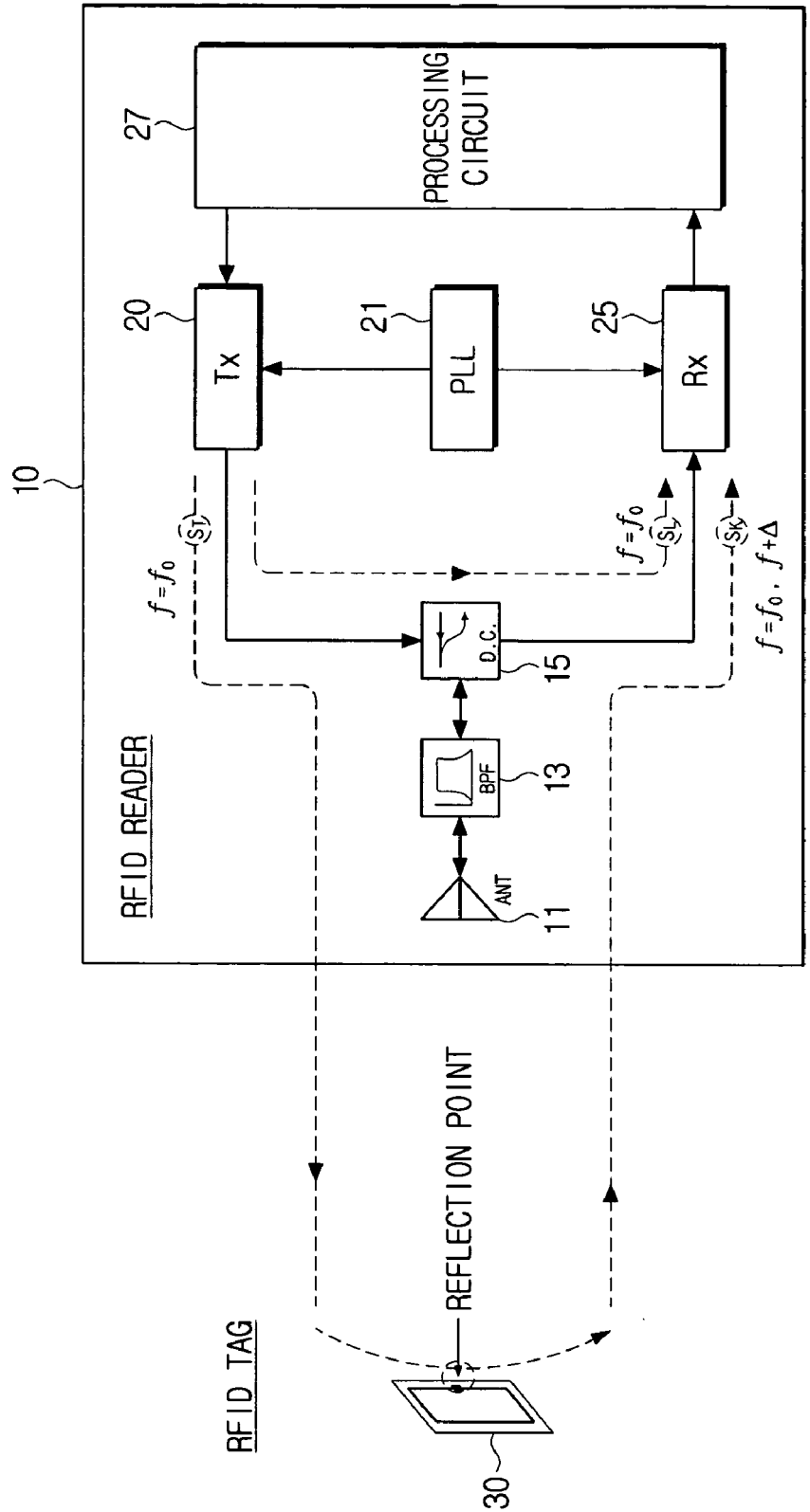
FIG. 1 is a schematic circuit diagram of a related RFID system composed of an RFID tag and an RFID reader 10.
Figure 2:
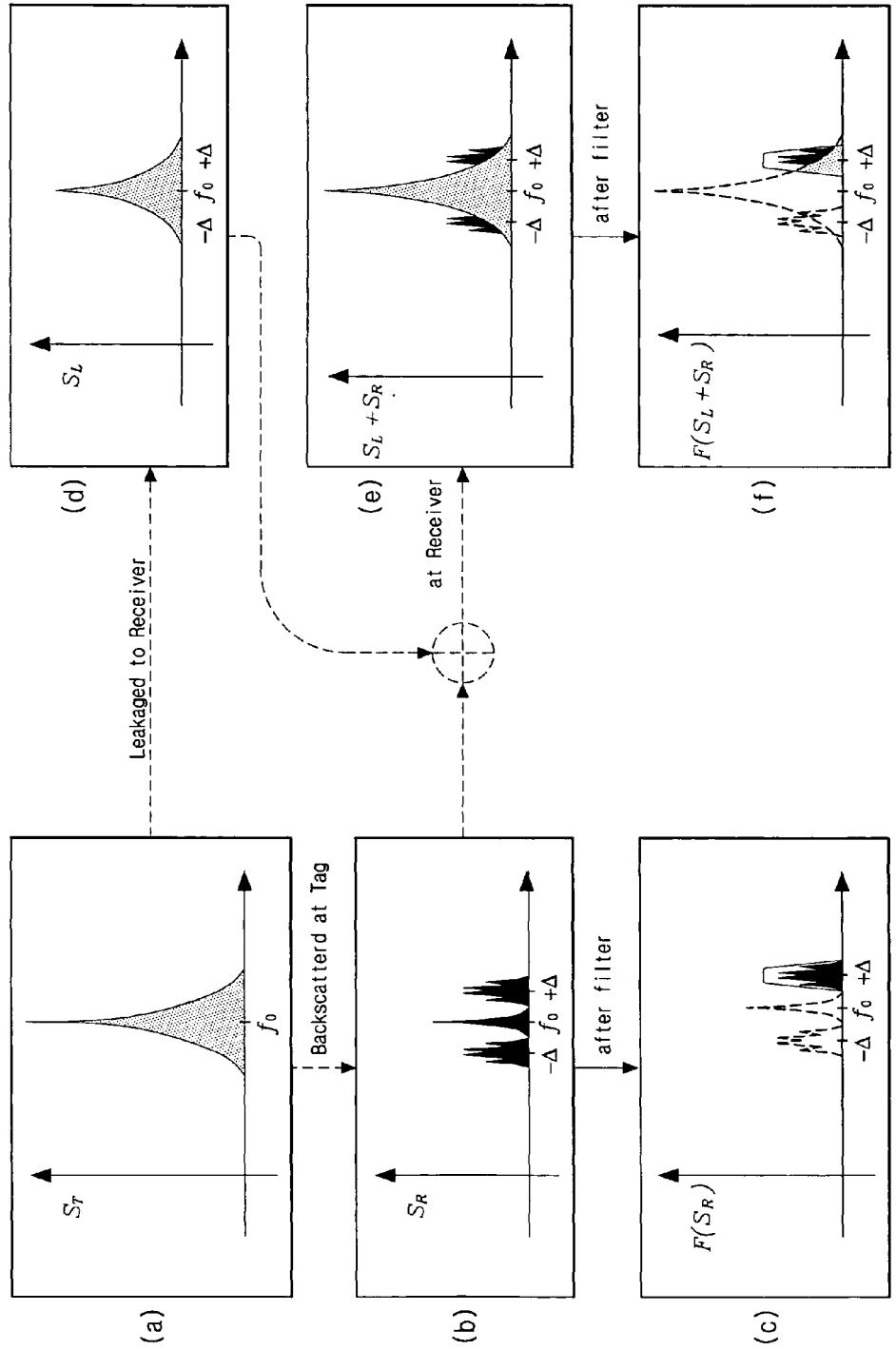
FIG. 2 are graphs illustrating a transmission carrier leakage signal, an RFID tag signal, and a received signal generated in the RFID system of FIG. 1.
Figure 3A:
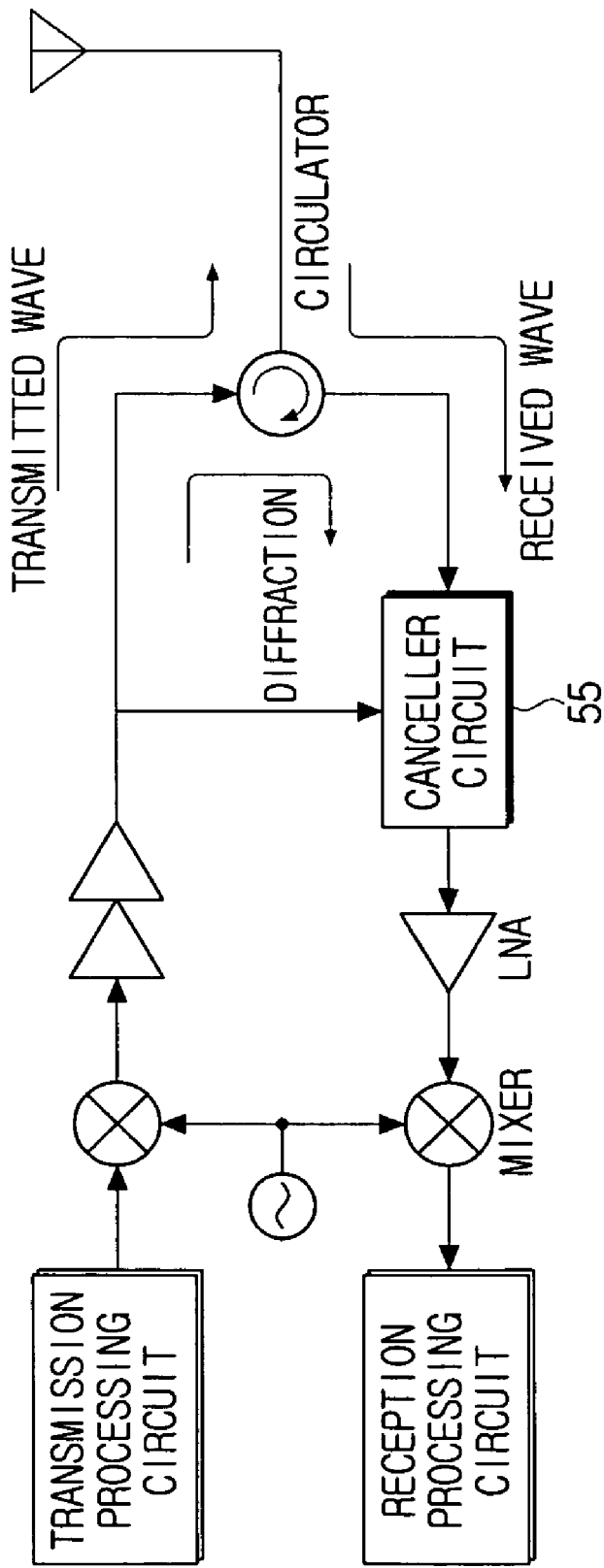
FIGS. 3A and 3B are circuit diagrams of a canceller circuit in a related RFID system and an RFID reader adopting the canceller.
Figure 3B:
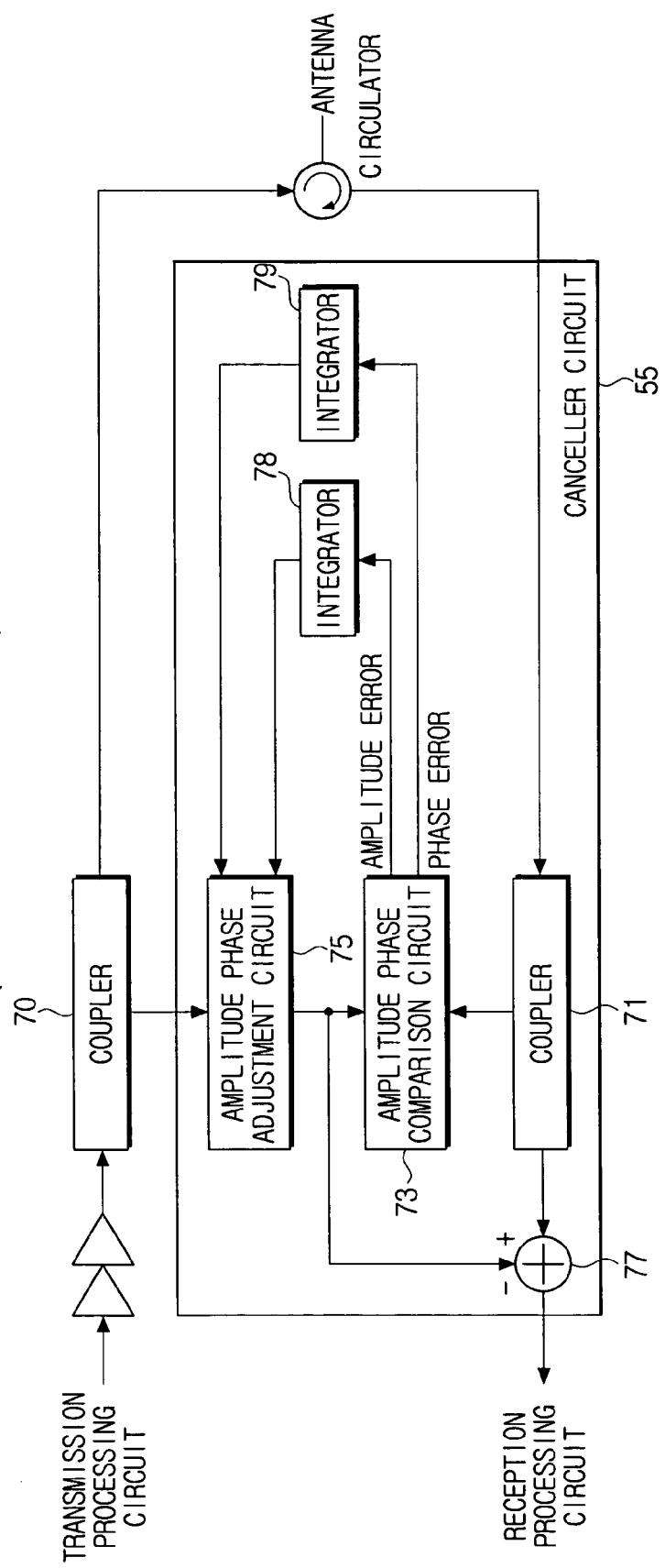

The input received signal is synthesized with the offset signal generated through the leakage removing circuit 150, and the transmission carrier leakage signal is removed from the received signal by the offset signal. Accordingly, the signal from the RFID tag, as illustrated in FIG. 2(b), is inputted to the LNA of the receiving circuit 111.

The RFID reader includes the leakage removing circuit 150 that has a simple construction composed of the signal detector 145, the gain amplifier 151, and the phase shifter 155, and removes the transmission carrier leakage signal.

As described above, according to an exemplary embodiment of the present invention, the transmission carrier leakage signal is effectively attenuated, and thus the problems of signal deterioration and DC offset can be solved. Also, as the desired linearity terms of components of the receiving circuit, such as an LNA and a down mixer, become easy, the saturation of the LNA and the down mixer can be prevented. Also, since the magnitude of the transmitted signal is increased, the dynamic range of the RFID reader is increased even without increasing the sensitivity of the RFID tag, and thus the communication distance between the RFID reader and the RFID tag can be increased. In addition, since the circuit construction of the RFID reader can be simplified, its manufacturing process becomes easy with its manufacturing cost reduced.

The foregoing embodiment is merely exemplary and is not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A radio frequency identification (RFID) reader comprising:
    a transmitting circuit which generates a transmitted signal to operate an RFID tag;
    a receiving circuit which receives a received signal including a tag signal from the RFID tag and a transmission carrier leakage signal leaking from the transmitting circuit; and
    a leakage removing circuit which senses a phase and an amplitude of the transmission carrier leakage signal inputted to the receiving circuit, converts the transmitted signal from the transmitting circuit into a signal having a phase opposite to that of the transmission carrier leakage signal and an amplitude equal to that of the transmission carrier leakage signal and generates an offset signal, and synthesizes the offset signal and the received signal inputted to the receiving circuit,
    wherein the receiving circuit comprises a signal detector installed on the receiving circuit which detects the transmission carrier leakage signal inputted to the receiving circuit and the offset signal output from the leakage removing circuit, and
    wherein the signal detector detects the amplitude and the phase of the transmission carrier leakage signal inputted from the transmitting circuit to the receiving circuit.

2. The RFID reader of claim 1, wherein the leakage removing circuit comprises:
    a gain amplifier which converts the amplitude of the transmitted signal from the transmitting circuit; and
    a phase shifter which generates the offset signal by adjusting the phase of the transmitted signal from the gain amplifier so that the phase of the transmitted signal becomes opposite to the phase of the transmission carrier leakage signal.

3. The RFID reader of claim 2, wherein the leakage removing circuit further comprises:
    a first switch mounted on a front end of the signal detector on the receiving circuit which switches the input of the received signal on/off; and
    a second switch arranged on a signal line which connects the transmitting circuit and the receiving circuit with each other to switch on/off the offset signal to the receiving circuit.

4. The RFID reader of claim 3, wherein when the signal detector detects the transmission carrier leakage signal, the first switch is turned on, and the second switch is turned off.

5. The RFID reader of claim 4, wherein when the signal detector detects the offset signal, the first switch is turned off, and the second switch is turned on.

6. The RFID reader of claim 5, wherein when the RFID tag is detected, both the first switch and the second switch are turned on, and the received signal inputted to the receiving circuit and the offset signal from the leakage removing circuit are synthesized to remove the transmission carrier leakage signal in the receiving circuit.

7. A radio frequency identification (RFID) reader having a transmitting circuit generating a transmitted signal to operate an RFID tag and a receiving circuit receiving a received signal including a tag signal from the RFID tag and a transmission carrier leakage signal leaking from the transmitting circuit, the RFID reader comprising:
    a gain amplifier converting the amplitude of the transmitted signal from the transmitting circuit;

a phase shifter generating an offset signal by adjusting the phase of the transmitted signal from the gain amplifier so that the phase of the transmitted signal becomes opposite to the phase of the transmission carrier leakage signal; and a signal detector installed on the receiving circuit to detect the transmission carrier leakage signal inputted to the receiving circuit and the offset signal generated through the gain amplifier and the phase shifter, wherein the signal detector detects the amplitude and the phase of the transmission carrier leakage signal inputted from the transmitting circuit to the receiving circuit.

* * * * *